(12) United States Patent
Li et al.

(10) Patent No.: US 12,262,279 B2
(45) Date of Patent: Mar. 25, 2025

(54) MEASUREMENT REPORTING AND RECEIVING METHOD, DEVICE AND EQUIPMENT

(71) Applicant: DATANG MOBILE COMMUNICATIONS EQUIPMENT CO., LTD., Beijing (CN)

(72) Inventors: Hui Li, Beijing (CN); Ren Da, Beijing (CN); Bin Ren, Beijing (CN); Deshan Miao, Beijing (CN); Xueyuan Gao, Beijing (CN); Gang Li, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 401 days.

(21) Appl. No.: 17/633,947

(22) PCT Filed: Jun. 23, 2020

(86) PCT No.: PCT/CN2020/097707
§ 371 (c)(1),
(2) Date: Feb. 8, 2022

(87) PCT Pub. No.: WO2021/027400
PCT Pub. Date: Feb. 18, 2021

(65) Prior Publication Data
US 2022/0295224 A1    Sep. 15, 2022

(30) Foreign Application Priority Data
Aug. 9, 2019 (CN) .......................... 201910734624.9

(51) Int. Cl.
*H04W 4/02* (2018.01)
*H04B 17/318* (2015.01)

(52) U.S. Cl.
CPC .......... *H04W 4/026* (2013.01); *H04B 17/318* (2015.01)

(58) Field of Classification Search
CPC .................................................... H04W 4/026
See application file for complete search history.

(56) References Cited

U.S. PATENT DOCUMENTS

2015/0188678 A1    7/2015   Wu et al.
2018/0310127 A1   10/2018   Xia et al.
(Continued)

FOREIGN PATENT DOCUMENTS

CN         105850055 A        8/2016
CN         107889141 A        4/2018
(Continued)

OTHER PUBLICATIONS

3GPP TSG-RAN3 Meeting #104, R3-192728; "Discussion on DL Positioning Procedure"; Agenda Item: 19.2; Source: Huawei; Reno, Nevada, US; May 13-17, 2019. (Year: 2019).*
(Continued)

*Primary Examiner* — Barry W Taylor
(74) *Attorney, Agent, or Firm* — Ladas & Parry, LLP (57) ABSTRACT

A measurement reporting and receiving method, a device and an equipment are provided. The method includes: measuring, by a terminal, positioning reference signals sent by a plurality of network side sending devices, and determining, according to a measurement result of the positioning reference signals sent by each network side sending device, angle of departure indication information of the each network side sending device; and sending, by the terminal, the angle of departure indication information of the plurality of network side sending devices to a network side positioning device.

12 Claims, 4 Drawing Sheets

(56) References Cited

U.S. PATENT DOCUMENTS

| | | | |
|---|---|---|---|
| 2018/0324738 A1 | 11/2018 | Stirling-Gallacher et al. | |
| 2019/0230547 A1 | 7/2019 | Li et al. | |
| 2020/0275236 A1* | 8/2020 | Gangakhedkar | H04W 4/025 |
| 2021/0368468 A1 | 11/2021 | Xing et al. | |
| 2022/0099785 A1* | 3/2022 | Priyanto | G01S 5/08 |
| 2022/0360304 A1* | 11/2022 | Penna | H04B 7/0695 |
| 2024/0064686 A1* | 2/2024 | Manolakos | G01S 1/08 |

FOREIGN PATENT DOCUMENTS

| | | |
|---|---|---|
| CN | 108226862 A | 6/2018 |
| CN | 108650200 A | 10/2018 |
| CN | 109392000 A | 2/2019 |
| CN | 109952801 A | 6/2019 |
| WO | 2018055482 A1 | 3/2018 |
| WO | 2019091584 A1 | 5/2019 |

OTHER PUBLICATIONS

International Search Report for PCT Application PCT/CN2020/097707 issued on Sep. 15, 2020 and its English Translation provided by WIPO.
Written Opinion for PCT Application PCT/CN2020/097707 issued on Sep. 15, 2020, and its English Translation provided by WIPO.
Internationally Preliminary Report on Patentability for PCT/CN2020/097707 issued on Feb. 8, 2022, and English translation provided by WIPO.
First Office Action for Chinese Patent Application 201910734624.9 issued on Jun. 23, 2021, and its English translation provided by Global dossier.
Second Office Action for Chinese Patent Application 201910734624.9 issued on Feb. 9, 2022 and its English translation provided by Global dossier.
First Office Action for Taiwanese Patent Application 109122966 issued on Apr. 23, 2022 and its English translation provided by applicant's foreign counsel.
Extended European Search Report for European Patent Application 20851719.3 issued on Aug. 3, 2022 by the European Patent Office.

* cited by examiner

Fig. 1 measuring, by a terminal, positioning reference signals sent by a plurality of network side sending devices, and determining, according to a measurement result of the positioning reference signals sent by each network side sending device, angle of departure indication information of the each network side sending device — 21 sending, by the terminal, the angle of departure indication information of the plurality of network side sending devices to a network side positioning device — 22

MEASUREMENT REPORTING AND RECEIVING METHOD, DEVICE AND EQUIPMENT

CROSS REFERENCE OF RELATED APPLICATION

The present application is the U.S. national phase of PCT Application PCT/CN2020/097707 filed on Jun. 23, 2020, which claims a priority of Chinese patent application No. 201910734624.9 filed on Aug. 9, 2019, which are incorporated herein by reference in their entireties.

TECHNICAL FIELD

The present disclosure relates to the field of communications technologies, and in particular, to a measurement reporting and receiving method, a device and an equipment.

BACKGROUND

In order to obtain the geographical location information of the terminal, a common terminal positioning method in the prior art is to measure Downlink Angle of Departure (DL-AoD) from multiple network side transmitting devices to the terminal, and calculate the location of the terminal by using the Downlink Angle of Departure from the multiple network side transmitting devices to the terminal. Specifically, the network side Transmission device may be a base station or a Transmission Reception Point (TRP).

In a New Radio (NR, also referred to as a New air interface) system, each base station transmits multiple downlink Positioning Reference Signals (PRS), and each Positioning Reference Signal is shaped to point to a different direction. The terminal measures Reference Signal Received Power (RSRP) of each beam, and feeds back an RSRP value of each beam to a positioning server on the network side. And the positioning server determines an angle of departure from the corresponding base station to the terminal according to the received RSRP value of each beam, so as to determine the position information of the terminal.

Figure 1:
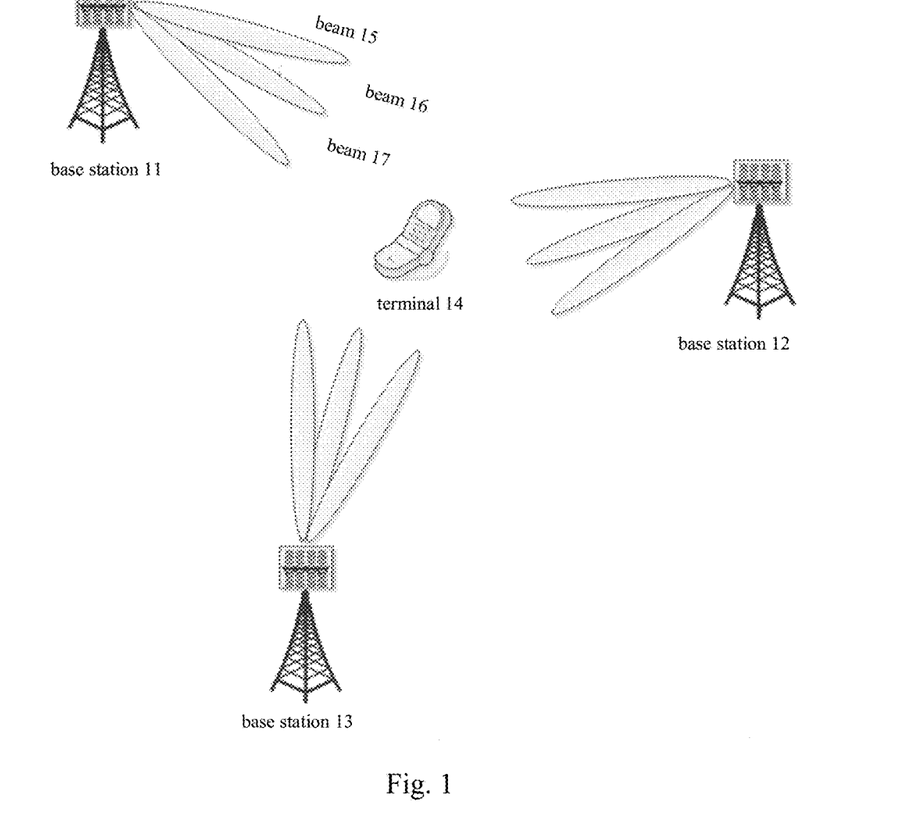
FIG. 1 is a schematic diagram of a downlink angle of departure measurement in the prior art.

FIG. 1 shows a schematic diagram of a downlink angle of departure measurement according to the prior art. In FIG. 1, terminal 14 measures a plurality of beams in base station 11, base station 12, and base station 13, respectively. For example, the terminal 14 measures 3 beams of the base station 11, such as the beams 15 to 17, and then feeds back RSRP corresponding to each beam. The positioning server may obtain the arrival angle from the base station 11 to the terminal 14 in an interpolation manner according to the RSRP of the 3 beams and the known sending angles corresponding to the 3 beams. Similarly, the base station 12 and the base station 13 perform the same operation. In this way, after obtaining the arrival angles from the multiple base stations to the terminal 14, the positioning server may use an existing angle-based algorithm to calculate the location information of the terminal.

SUMMARY

At least one embodiment of the present disclosure provides a measurement reporting and receiving method, a device and an apparatus, so as to reduce resource overhead of positioning measurement reporting.

A measurement reporting method is provided in the present disclosure, including:

measuring, by a terminal, positioning reference signals sent by a plurality of network side sending devices, and determining, according to a measurement result of the positioning reference signals sent by each network side sending device, angle of departure indication information of the each network side sending device; and sending, by the terminal, the angle of departure indication information of the plurality of network side sending devices to a network side positioning device.

Optionally, prior to the measuring by the terminal the positioning reference signals sent by the plurality of network side sending devices, the method further includes:

receiving measurement configuration information sent by the network side positioning devices, where the measurement configuration information includes configuration information of the positioning reference signals and configuration information of reported measurement, and the measurement includes the angle of departure indication information.

Optionally, the angle of departure indication information includes at least one of:

an angle of departure index corresponding to an angle of departure;

a value of the angle of departure.

Optionally, the angle of departure index is represented by an index value of the angle of departure index, or the angle of departure index is represented by a reference index of one of the positioning reference signals sent by each network side sending device and an offset relative to the reference index.

Optionally, in a case that the angle of departure index is represented by the reference index and the offset, the determining the angle of departure indication information of the each network side sending device includes:

selecting the network side sending devices meeting preset conditions, according to a Reference Signal Received Power (RSRP) of positioning reference signals sent by the plurality of network side sending devices; and for each of the selected network side sending devices, performing a curve fitting by using the an index and RSRP of the positioning reference signals sent by the each of the selected network side sending devices, and determining the reference index and an index offset corresponding to the angle of departure of the each of the selected network side sending devices, according to a position point of a maximum RSRP on a curve obtained by the curve fitting.

Optionally, in a case that the angle of departure indication information is the value of the angle of departure, the determining the angle of departure indication information of the each network side sending device includes:

selecting the network side sending devices meeting preset conditions, according to RSRP of positioning reference signals sent by the plurality of network side sending devices; and for each of the selected network side sending devices, performing a curve fitting by using the indexes and RSRPs of the positioning reference signals sent by the each of the selected network side sending devices, and determining the angle of departure index corresponding to the angle of departure of the each of the selected network side sending devices, and determining angle information corresponding to the angle of departure index according to pre-obtained angle information of a beam direction corresponding to each positioning reference signal sent by the each of the selected network side sending devices, to obtain a value of the angle of departure of the each of the selected network side sending devices.

Optionally, the method further includes:

sending the RSRP corresponding to the angle of departure indication information of the each of the selected network side sending devices to a network side positioning device, where the RSRP corresponding to the angle of departure indication information of the each of the selected network side sending devices is a maximum RSRP on a curve obtained by the curve fitting.

Optionally, prior to the determining the angle of departure indication information of the each network side sending device includes:

receiving the angle information of the beam direction corresponding to each positioning reference signal sent by the each of the selected network side sending devices.

A measurement receiving method is further provided in the present disclosure, including:

receiving, by a network side positioning device, angle of departure indication information of a plurality of network side sending devices which is measured and reported by a terminal; and determining, by the network side positioning device, position information of the terminal, according to the angle of departure indication information of the plurality of network side sending devices.

Optionally, prior to the receiving by the network side positioning device the angle of departure indication information of the plurality of network side sending devices which is measured and reported by the terminal, the method further includes:

sending measurement configuration information to the terminal, where the measurement configuration information includes configuration information of the positioning reference signals and configuration information of reported measurement, and the measurement includes the angle of departure indication information.

Optionally, the angle of departure indication information includes at least one of:

an angle of departure index corresponding to an angle of departure;

a value of the angle of departure.

Optionally, the angle of departure index is represented by an index value of the angle of departure index, or the angle of departure index is represented by a reference index of one of the positioning reference signals sent by each network side sending device and an offset relative to the reference index.

Optionally, in a case that the angle of departure indication information is the angle of departure index corresponding to the angle of departure, the determining by the network side positioning device the position information of the terminal includes:

based on the angle of departure index corresponding to the angle of departure of each network side sending device and angle information of a beam direction corresponding to each positioning reference signal sent by the each network side sending device, determining angle information corresponding to the angle of departure index of the each network side sending device, to obtain a value of the angle of departure of the each network side sending device; and determining the position information of the terminal, by using an angle positioning algorithm and according to the values of the angle of departure of the plurality of network side sending devices.

Optionally, in a case that the angle of departure indication information is the value of the angle of departure, the determining the position information of the terminal includes:

determining the position information of the terminal, by using an angle positioning algorithm and according to the values of the angle of departure of the plurality of network side sending devices.

Optionally, the method further includes:

receiving a reference signal received power (RSRP) corresponding to angle of departure indication information of the plurality of network side sending devices sent by the terminal.

Optionally, in a case that the network side positioning device is a positioning server at a network side, the method further includes:

receiving, by the network side positioning device, angle information of a beam direction corresponding to the positioning reference signal reported by the network side sending device.

Optionally, prior to the receiving by the network side positioning device the angle of departure indication information of the plurality of network side sending devices which is measured and reported by the terminal, the method further includes:

indicating by the network side positioning device, to the terminal, angle information of a beam direction corresponding to the positioning reference signal.

A measurement reporting device is further provided in the present disclosure, includes:

a measuring unit, configured to measure positioning reference signals sent by a plurality of network side sending devices, and determine, according to a measurement result of the positioning reference signals sent by each network side sending device, angle of departure indication information of the each network side sending device;

a reporting unit, configured to send the angle of departure indication information of the plurality of network side sending devices to a network side positioning device.

A terminal is further provided in the present disclosure, including: a memory, a processor, a transceiver, and a program stored in the memory and executable on the processor, where the processor is configured to execute the program to perform:

measuring positioning reference signals sent by a plurality of network side sending devices, and determining, according to a measurement result of the positioning reference signals sent by each network side sending device, angle of departure indication information of the each network side sending device;

the transceiver is configured to send the angle of departure indication information of the plurality of network side sending devices to a network side positioning device.

A measurement receiving device is further provided in the present disclosure, including:

a receiving unit, configured to receive angle of departure indication information of a plurality of network side sending devices which is measured and reported by a terminal; and a position determining unit, configured to determine position information of the terminal, according to the angle of departure indication information of the plurality of network side sending devices.

A network-side positioning apparatus is further provided in the present disclosure, including: a memory, a processor, a transceiver, and a program stored in the memory and executable on the processor, where the transceiver is configured to receive angle of departure indication information of a plurality of network side sending devices which is measured and reported by a terminal; and the processor is configured to execute the program to perform: determining position information of the terminal, according to the angle of departure indication information of the plurality of network side sending devices.

A computer storage medium is further provided in the present disclosure, including an instruction, where the instruction is configured to be executed by a computer to perform the method hereinabove.

The beneficial effects of the embodiment of the disclosure are: the terminal does not need to report RSRP of a plurality of positioning reference signal PRS resources of a plurality of network side sending devices, and only needs to report the indication information of the angle of departure for each network side sending device, so that the resource overhead reported by positioning measurement can be greatly reduced

BRIEF DESCRIPTION OF THE DRAWINGS

Various other advantages and benefits will become apparent to those of ordinary skill in the art upon reading the following detailed description of the alternative embodiments. The drawings are only for purposes of illustrating alternative embodiments and are not to be construed as limiting the disclosure. Also, like reference numerals are used to refer to like parts throughout the drawings. In the drawings.

DETAILED DESCRIPTION

Exemplary embodiments of the present disclosure will be described in more detail below with reference to the accompanying drawings. While exemplary embodiments of the present disclosure are shown in the drawings, it should be understood that the present disclosure may be embodied in various forms and should not be limited by the embodiments set forth herein. Rather, these embodiments are provided so that this disclosure will be thorough and complete, and will fully convey the scope of the disclosure to those skilled in the art.

The terms first, second and the like in the description and in the claims of the present application are used for distinguishing between similar elements and not necessarily for describing a particular sequential or chronological order. It is to be understood that the data so used may be interchanged under appropriate circumstances such that the embodiments of the application described herein may be implemented, for example, in sequences other than those illustrated or described herein. Moreover, the terms "includes," "including," and "having," and any variations thereof, are intended to cover a non-exclusive inclusion, such that a process, method, system, article, or apparatus that includes a list of steps or elements is not necessarily limited to those steps or elements expressly listed, but may include other steps or elements not expressly listed or inherent to such process, method, article, or apparatus. In the description and in the claims "and/or" means at least one of the connected objects.

The techniques described herein are not limited to Long Time Evolution (LTE)/LTE Evolution (LTE-Advanced, LTE-a) systems and NR systems, and may also be used for various wireless communication systems, such as Code Division Multiple Access (CDMA), Time Division Multiple Access (TDMA), Frequency Division Multiple Access (FDMA), Orthogonal Frequency Division Multiple Access (OFDMA), Single carrier Frequency Division Multiple Access (SC-FDMA), and other systems. The terms "system" and "network" are often used interchangeably. CDMA systems may implement Radio technologies such as CDMA2000, Universal Terrestrial Radio Access (UTRA), and so on. UTRA includes Wideband CDMA (WCDMA) and other CDMA variants. TDMA systems may implement radio technologies such as Global System for Mobile communications (GSM). The OFDMA system may implement radio technologies such as Ultra Mobile Broadband (UMB), evolved-UTRA (E-UTRA), IEEE 802.11 (Wi-Fi), IEEE 802.16 (WiMAX), IEEE 802.20, Flash-OFDM, etc. UTRA and E-UTRA are parts of the Universal Mobile Telecommunications System (UMTS). LTE and LTE-advanced (e.g., LTE-A) are new UMTS releases that use E-UTRA. UTRA, E-UTRA, UMTS, LTE-A and GSM are described in the literature from an organization named "third Generation Partnership Project" (3 GPP). CDMA2000 and UMB are described in documents from an organization named "third generation partnership project 2" (3 GPP 2). The techniques described herein may be used for both the above-mentioned systems and radio technologies, as well as for other systems and radio technologies. However, the following description describes NR systems for purposes of example, and NR terminology is used in much of the description below, although the techniques may also be applied to applications other than NR system applications.

The following description provides examples, and does not limit the scope, applicability, or configuration set forth in the claims. Changes may be made in the function and arrangement of elements discussed without departing from the spirit and scope of the disclosure. Various examples may omit, substitute, or add various procedures or components as appropriate. For example, the methods described may be performed in an order different than described, and various steps may be added, omitted, or combined. Additionally, features described with reference to certain examples may be combined in other examples.

As described above, in the positioning scheme based on the downlink angle of departure in the prior art, the terminal needs to feed back RSRP measured by the terminal on beams of multiple base stations, and each base station includes multiple beams. For example, the terminal measures M base stations, each of which contains N transmit beams. Thus, the terminal needs to feed back MxN values of RSRP. The reporting of these measurements will occupy a large resource overhead.

Figure 2:
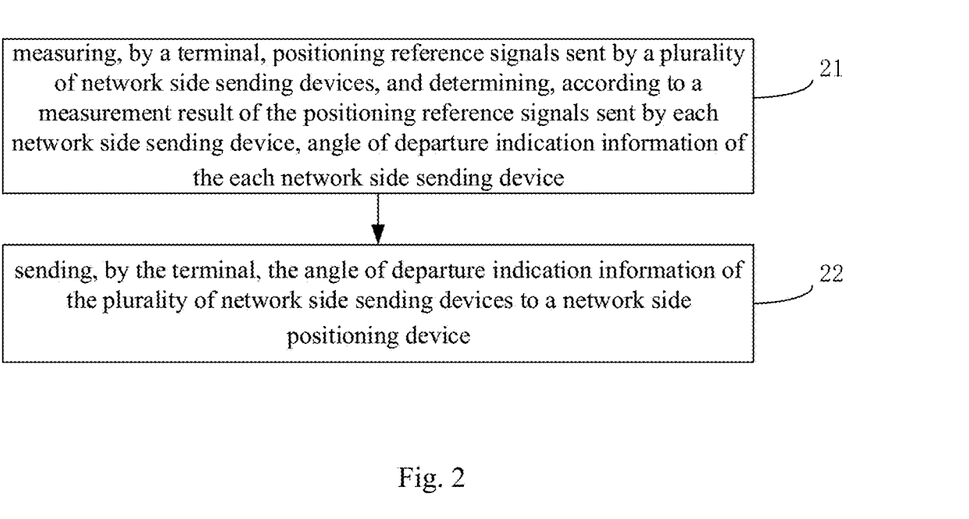
FIG. 2 is a flowchart of a measurement reporting method according to an embodiment of the present disclosure.

In order to reduce resource overhead of positioning measurement reporting, an embodiment of the present disclosure provides a measurement reporting method, as shown in FIG. 2, when the method is applied to a terminal side, the method includes:

Step 21: measuring, by a terminal, positioning reference signals sent by a plurality of network side sending devices, and determining, according to a measurement result of the positioning reference signals sent by each network side sending device, angle of departure indication information of the each network side sending device.

Here, the network side transmission device may specifically be a base station and/or a Transmission Reception Point (TRP). In general, one cell may include joint coverage by a plurality of TRPs. The terminal may measure Positioning Reference Signals (PRS) sent by multiple network side sending devices, and for each network side sending device, determine angle of departure indication information of the network side sending device according to a measurement result (such as RSRP) of the multiple positioning reference signals sent by the network side sending device, so as to obtain angle of departure indication information of each of the multiple network side sending devices.

Step 22: sending, by the terminal, the angle of departure indication information of the plurality of network side sending devices to a network side positioning device.

Here, the network side positioning device may be one of the plurality of network side transmitting devices, for example, one of the base stations or the TRP, or may be a positioning server provided on the network side. The terminal sends the obtained angle of departure indication information of the multiple network side sending devices to the network side positioning device, specifically, to a base station, a TRP, or a positioning server on the network side. When transmitting to the location server, the above-mentioned angle of departure indication information may be forwarded to the location server via a serving base station (TRP) of the terminal.

Through the above steps, the embodiment of the present disclosure may send the angle of departure indication information of multiple network side sending devices to the network side positioning device, so that the network side positioning device may determine the location information of the terminal according to the angle of departure indication information, thereby implementing the positioning of the terminal. In the measurement reporting method, the terminal does not need to report the values of the RSRPs of the positioning reference signals of the network side sending devices, but only needs to report the angle of departure indication information of each network side sending device, so that the resource overhead of positioning measurement reporting can be greatly reduced, and signaling resources are saved.

In this embodiment of the present disclosure, prior to the Step 21, the terminal may further receive measurement configuration information sent by a network side positioning device (such as a base station or a TRP), where the measurement configuration information includes configuration information of the positioning reference signal and configuration information of a reported measurement. The configuration information of the positioning reference signal may specifically include information such as a time-frequency domain resource location of the positioning reference signal, and the measurement includes angle of departure indication information. Therefore, the terminal can detect and measure the positioning reference signal sent by the sending device at the network side according to the configuration information of the positioning reference signal, and perform targeted measurement reporting according to the reported configuration information of the measurement when performing measurement.

The angle of departure indication information described in the embodiments of the present disclosure may specifically be one or more of the following information: an angle of departure index corresponding to an angle of departure; the value of the angle of departure. The value of the angle of departure is used to indicate the specific angle of the angle of departure. The angle of departure index corresponding to the angle of departure is used to indicate the positioning reference signal corresponding to the angle of departure, and the positioning reference signal corresponding to the angle of departure may be the same as a certain positioning reference signal sent by the network side sending device or different from all the positioning reference signals sent by the network side sending device. Therefore, the angle of departure index may be specifically represented by an index of a known positioning reference signal plus an offset, for example, by an index (i.e., a reference index) of one of the multiple positioning reference signals sent by the network side sending device and an offset from the reference index. Of course, the above-mentioned angle of departure index may be directly represented by an index value of the angle of departure index.

When the angle of departure index is represented by the reference index and the offset, according to at least one embodiment of the present disclosure, when determining the angle of departure indication information in step 21, the determining may specifically include:

A) the terminal may select a network side transmitting device that satisfies a preset condition according to Reference Signal Received Power (RSRP) of positioning reference signals transmitted by a plurality of network side transmitting devices.

For example, according to the minimum number Y of network side transmitting devices required for positioning, the top X network side transmitting devices are selected according to the ranking from high to low of the maximum RSRP of the positioning reference signal transmitted by each network side transmitting device, where X is greater than or equal to Y and X is less than or equal to the total number of the plurality of network side transmitting devices. This can reduce the amount of computation of the terminal to some extent.

For another example, the network side sending device with the maximum RSRP greater than the preset threshold is selected according to the high-to-low ranking of the maximum RSRP of the positioning reference signals sent by each network side sending device. Therefore, the selected network side sending device for calculating the angle of departure indication information has higher reliability, and the accuracy of the calculated angle of departure is further ensured.

Of course, the embodiments of the present disclosure may also make no choice, so that when determining the angle of departure indication information, RSRP of positioning reference signals of all network side sending devices is utilized.

B) for each selected network side sending device, performing curve fitting by using the indexes and RSRP of the positioning reference signals sent by the network side sending device, and determining a reference index and an index offset corresponding to an angle of departure of the network side sending device according to a position point of the maximum RSRP on a curve obtained by fitting.

Here, a curve fitting manner may be adopted to obtain a fitted curve, and find a position point with the maximum RSRP on the fitted curve, where the position point corresponds to an angle of departure index of an angle of departure of the network side sending device, so that an index of a certain positioning reference signal sent by a network side sending device adjacent to the position point may be used as the reference index, and the index offset may be determined according to a distance between the position point and the reference index.

When the indication information of the angle of departure is a value of the angle of departure, according to another embodiment of the present disclosure, when determining the indication information of the angle of departure in step 21, the determining may specifically include:

a) the terminal may select a network side transmitting device that satisfies a preset condition according to Reference Signal Received Power (RSRP) of positioning reference signals transmitted by a plurality of network side transmitting devices.

b) for each selected network side sending device, performing curve fitting by using the indexes and RSRP of the multiple positioning reference signals sent by the network side sending device, and determining the angle of departure index of the network side sending device according to the position point of the maximum RSRP on the curve obtained by fitting.

The steps a and b are similar to the steps A and B, and are not described again.

c) determining the angle information corresponding to the angle of departure index according to the angle information of the beam direction corresponding to each positioning reference signal sent by the network side sending device, which is obtained in advance, so as to obtain the value of the angle of departure of the network side sending device.

Here, the index of the plurality of positioning reference signals transmitted by the network side transmitting device and the angle information of the beam direction corresponding to each positioning reference signal may be used to perform curve fitting, and the value of the angle of departure of the network side transmitting device may be determined according to the angle information corresponding to the angle of departure index on the curve obtained by fitting.

In addition, when determining the angle of departure index and the angle information corresponding to the angle of departure index, the embodiments of the present disclosure may use curve fitting manners including, but not limited to, linear fitting, high-order polynomial fitting, and the like, which is not specifically limited in this respect.

In order to facilitate calculation of the angle information corresponding to the angle of departure index, before step 21, the terminal may further receive the angle information of the beam direction corresponding to the positioning reference signal sent by the network side sending device, so as to perform the curve fitting calculation processing.

In addition, in step 22 of the embodiment of the present disclosure, the terminal may further send RSRP corresponding to the angle of departure indication information of the network side sending device to the network side positioning device, where the RSRP corresponding to the angle of departure indication information of the network side sending device is a maximum RSRP on a curve obtained by fitting in step B or B. Therefore, the network side positioning device can select the network side sending device with the RSRP larger than the preset quality threshold from the plurality of network side sending devices according to the RSRP corresponding to the angle of departure indication information of each network side sending device, and the terminal is positioned by using the angle of departure indication information of the selected network side sending device, so that the calculated amount can be reduced, and the accuracy of the positioning result can be improved.

Figure 3:
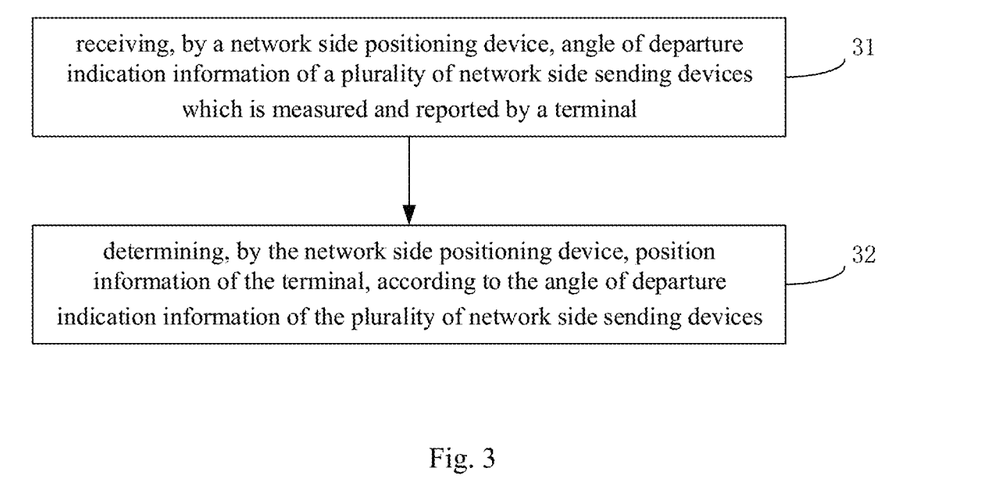
FIG. 3 is a flowchart of a measurement receiving method according to an embodiment of the disclosure.

Referring to FIG. 3, the measurement receiving method provided in the embodiment of the present disclosure is applied to a network side positioning device, where the network side positioning device may be one of multiple network side transmitting devices, for example, one of the multiple network side transmitting devices may be a base station or a TRP, and may also be a positioning server disposed on a network side. As shown in FIG. 3, the method includes:

Step 31: receiving, by a network side positioning device, angle of departure indication information of a plurality of network side sending devices which is measured and reported by a terminal.

Here, the angle of departure indication information includes at least one of the following information: an angle of departure index corresponding to an angle of departure; the value of the angle of departure. The angle of departure index may be represented by an index value of the angle of departure index, or may be represented by a reference index of one of the multiple positioning reference signals sent by the network side sending device, and an offset from the reference index.

The network side positioning device may specifically be a network side positioning server and/or a network side sending device. The network side transmitting device may specifically include a TRP and/or a base station. When the network side device is a positioning server, the positioning server may receive angle of departure indication information of a plurality of network side transmitting devices reported by the terminal and forwarded via a serving base station (TRP).

Step 32: determining, by the network side positioning device, position information of the terminal, according to the angle of departure indication information of the plurality of network side sending devices.

Here, when the angle of departure indication information is a value of an angle of departure of a network side transmission device, the network side device may determine the location information of the terminal by using various angle positioning algorithms according to the values of the angle of departures of the plurality of network side transmission devices. Specific angular positioning algorithm embodiments of the present disclosure are not limited.

When the angle of departure indication information is an angle of departure index corresponding to an angle of departure, the network side device may determine, according to an angle of departure index corresponding to an angle of departure of each network side transmitting device and angle information of a beam direction corresponding to each positioning reference signal transmitted by the network side transmitting device, angle information corresponding to the angle of departure index of the network side transmitting device, to obtain a value of the angle of departure of the network side transmitting device; and then, determining the position information of the terminal by utilizing an angle positioning algorithm according to the values of the angle of departures of the plurality of network side sending devices. Specifically, the angle information corresponding to the angle of departure index of the network-side sending device is determined, and reference may be made to the processing manner of curve fitting in the foregoing, and details are not described here for saving space.

Through the steps, in the embodiment of the disclosure, the network side positioning device can calculate the position of the terminal only by receiving the angle of departure indication information of each network side sending device, and does not need to receive the RSRP of each positioning reference signal sent by each network side sending device, so that the resource overhead reported by positioning measurement in the positioning process can be greatly reduced.

In addition, in step 32, if the positioning server on the network side determines the location information of the terminal according to the angle of departure indication information of the multiple network-side transmitting devices, before determining the location information of the terminal, the positioning server on the network side may further receive angle information of a beam direction corresponding to the positioning reference signal reported by the network-side transmitting device, so that the positioning server performs terminal positioning accordingly.

In addition, according to at least one embodiment of the present disclosure, before step 31, a network side positioning device (such as a base station or a TRP) may further send measurement configuration information to the terminal, where the measurement configuration information includes configuration information of the positioning reference signal and configuration information of a reported measurement, and the measurement includes angle of departure indication information. Therefore, the terminal can detect and measure the positioning reference signal sent by the sending device at the network side according to the configuration information of the positioning reference signal, and carry out targeted measurement reporting according to the reported configuration information of the measurement when carrying out measurement.

Optionally, in step 31, the network side positioning device may further receive RSRP corresponding to angle of departure indication information of multiple network side sending devices sent by the terminal. In step 32, the network side positioning device may select, according to an RSRP corresponding to the angle of departure indication information of the network side sending device, a network side sending device with an RSRP greater than a preset quality threshold from the multiple network side sending devices, and determine the location information of the terminal according to the angle of departure indication information of the selected network side sending device. The processing mode can ensure the reliability of the angle of departure for terminal positioning processing, reduce the calculation amount of the positioning processing and improve the accuracy of the positioning result.

Optionally, in order to facilitate the terminal to calculate the value of the angle of departure, before step 31, the network-side positioning device (e.g., the base station or the TRP) may further indicate the angle information of the beam direction corresponding to the positioning reference signal to the terminal, so that the terminal may calculate the value of the angle of departure by using the angle information and report the value to the network-side positioning device.

The measurement reporting and receiving methods of the embodiments of the present disclosure are described above from the terminal and the network side, respectively. The above method is further explained by the interaction example of two terminals and the network side.

EXAMPLE 1 in example 1, the angle of departure index corresponding to the angle of departure indicating information is described as an example.

Assuming that each transmit-receive point (TRP) configures resources of M=8 Positioning Reference Signals (PRSs), each PRS is shaped differently, pointing in a different direction. The network side (which may be a positioning server or a base station) configures angle of departure indication information of a terminal with an uplink report amount of N=6 TRPs, and indicates configuration information of PRS resources of the transmitting and receiving points to the terminal.

1) the base station reports the angle information corresponding to each shaped PRS in the M=8 PRSs sent by each TRP to a positioning server.

2) the terminal determines RSRP for each of M=8 PRSs transmitted per TRP. And determining N=6 TRPs from the TRPs to report the angle of departure indication information. One way to determine this is that of the N=6 TRPs, the largest RSRP of the M=8 PRS transmitted by each TRP is ordered first 6.

Figure 4:
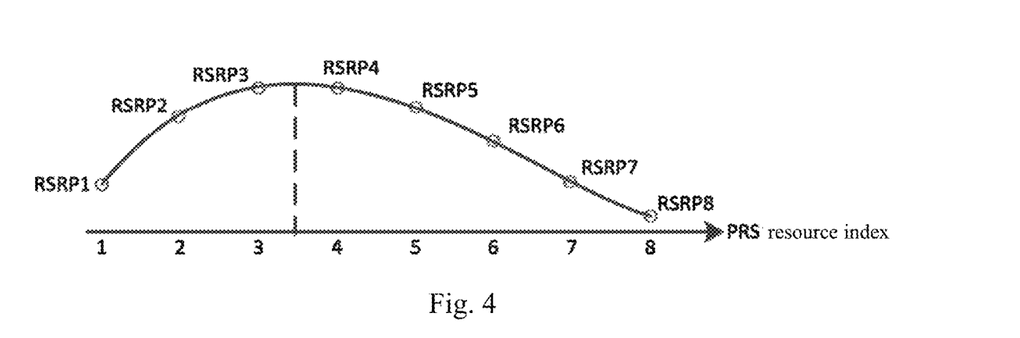
FIG. 4 is an exemplary graph of curve fitting in determining an angle of departure index in an embodiment of the present disclosure.

3) the terminal determines angle of departure indication information for each of the N=6 TRPs. Taking the kth TRP as an example, the measured RSRPs are respectively denoted as RSRP1, RSRP2, . . . , and RSRP8. Linear interpolation, second-order interpolation or higher-order interpolation measurement is performed on the 8 RSRPs, and as shown in FIG. 4, curve fitting is performed by a higher-order polynomial, so as to obtain a maximum RSRP (i.e., RSRP at the dashed line) on the curve, where a reference index of a reference signal corresponding to the maximum RSRP is 3, and an index offset is 0.5, i.e., an index value of an angle of departure index is 3+0.5=3.5. Meanwhile, the value of the maximum RSRP at the dotted line can be calculated through the fitted polynomial.

4) the terminal reports leaving angle indication information (namely leaving angle indexes corresponding to leaving angles) of each TRP in the N=6 TRPs to the positioning server.

Figure 5:
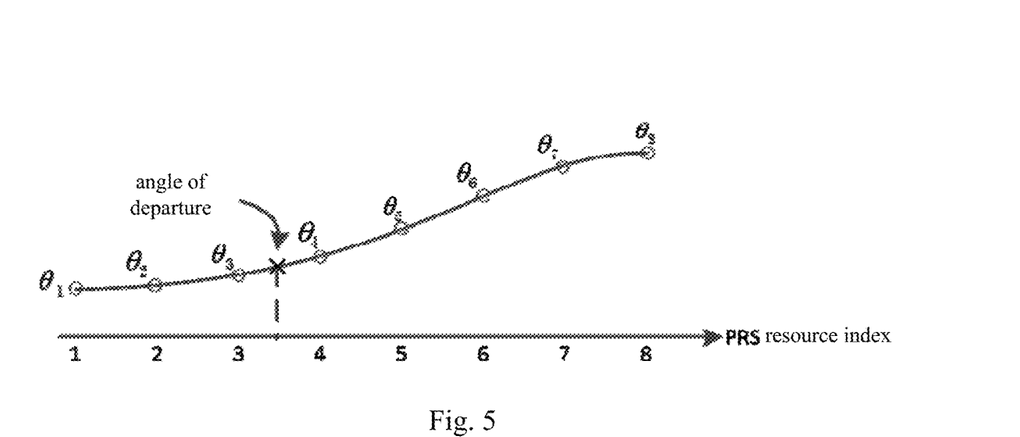
FIG. 5 is an exemplary graph of a curve fitting in determining a value of an angle of departure in an embodiment of the present disclosure.

5) the positioning server determines the leaving angles of the N=6 TRPs according to angle information corresponding to each PRS sent by each TRP in the N=6 TRPs reported by the base station and the leaving angle indication information of each TRP reported by the terminal. One way to determine the angle of departure is shown in FIG. 5, and for the kth TRP, the positioning server knows the angle information corresponding to M=8 PRS, which is denoted as $\theta_1$, $\theta_2$, . . . , $\theta_8$. Here, a linear fitting manner may be adopted, and the positioning server may determine the angle information with an index of 3 and an offset of 0.5, which is the corresponding angle of departure of TRP.

6) the positioning server can obtain the position information of the terminal by adopting the existing angle positioning algorithm according to the 6 angle of departures corresponding to the N=6 TRPs.

EXAMPLE 2 the example 2 is described by taking the angle of departure indication information as an example of the value of the angle of departure.

Assuming that each transmit-receive point (TRP) configures resources of M=8 PRSs, each PRS is shaped differently, pointing in a different direction.

1) the network side (which may be a positioning server or a base station) configures angle of departure indication information of a terminal with an uplink report amount of N=6 TRPs, and indicates configuration information of PRS resources of the transmitting and receiving points to the terminal.

2) the base station reports the angle information corresponding to each shaped PRS in the M=8 PRSs sent by each TRP to a positioning server.

3) the positioning server indicates the angle information corresponding to each PRS in the PRSs sent by each TRP to the terminal.

4) the terminal determines RSRP of each PRS in M=8 PRSs transmitted by each TRP, and determines N=6 TRPs for reporting angle of departure indication information. One way to determine this is that of the N=6 TRPs, the largest RSRP of the M=8 PRS transmitted by each TRP is ordered first 6.

5) the terminal determines angle of departure indication information for each of the N=6 TRPs. Taking the kth TRP as an example, the measured RSRPs are respectively denoted as RSRP1, RSRP2, . . . , and RSRP8. And processing the 8 RSRPs by linear interpolation, second-order interpolation or high-order interpolation and the like. Still taking the example of fitting with high-order polynomial shown in FIG. 4, the maximum RSRP (i.e. RSRP at the dotted line) can be obtained with the index of the corresponding reference signal being 3, and the index offset being 0.5, i.e. the index value of the angle of departure index being 3.5. Meanwhile, the RSRP value at the dotted line can be calculated through the fitted polynomial.

6) the terminal determines the angle of departures of N=6 TRPs according to the angle information corresponding to each PRS indicated by the positioning server. Still taking the curve fitting shown in FIG. 5 as an example, for the kth TRP, the terminal knows the angle information corresponding to M=8 PRS, which is denoted as. Using a linear fit, the positioning server may determine the angle information at an index of 3 and an offset of 0.5, which is the angle of departure corresponding to the TRP.

7) the terminal reports the determined 6 angle of departures corresponding to the N=6 TRPs to a positioning server as angle of departure indication information.

8) the positioning server can obtain the position information of the terminal by adopting the existing angle positioning algorithm.

Various methods of embodiments of the present disclosure have been described above. An apparatus for carrying out the above method is further provided below.

Figure 6:
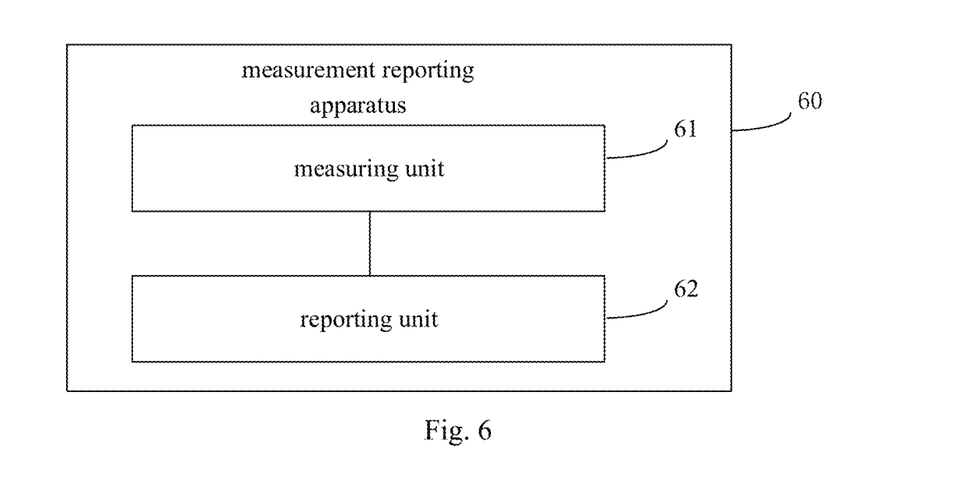
FIG. 6 is a flowchart of a measurement reporting device according to an embodiment of the present disclosure.

Referring to FIG. 6, an embodiment of the present disclosure provides a measurement reporting apparatus 60, which can be applied to a terminal, and as shown in FIG. 6, the measurement reporting apparatus 60 includes:
- a measuring unit 61, configured to measure positioning reference signals sent by multiple network side sending devices, and determine angle of departure indication information of the network side sending device according to measurement results of multiple positioning reference signals sent by the same network side sending device;
- a reporting unit 62, configured to send the angle of departure indication information of the multiple network-side sending devices to a network-side positioning device.

Optionally, the measurement reporting apparatus 60 further includes:
- a first receiving unit (not shown in FIG. 6), configured to receive measurement configuration information sent by a network-side positioning device before measuring positioning reference signals sent by multiple network-side sending devices, where the measurement configuration information includes configuration information of the positioning reference signals and configuration information of reported measurements, and the measurements include angle of departure indication information.

Optionally, the angle of departure indication information includes at least one of the following information:
- an angle of departure index corresponding to an angle of departure;
- the value of the angle of departure.

Optionally, the angle of departure index is represented by an index value of the angle of departure index,
- the angle of departure index is represented by a reference index of one of the positioning reference signals sent by the network side sending device and an offset relative to the reference index.

Optionally, the measuring unit 61 is further configured to select, when the angle of departure index is represented by the reference index and the offset, a network side sending device that meets a preset condition according to reference signal received power, RSRP, of a positioning reference signal sent by multiple network side sending devices; and for each selected network side sending device, performing curve fitting by using the indexes and RSRP of the positioning reference signals sent by the network side sending device, and determining a reference index and an index offset corresponding to an angle of departure of the network side sending device according to a position point of the maximum RSRP on a curve obtained by fitting.

Optionally, the measuring unit 61 is further configured to select, when the angle of departure indicating information is a value of an angle of departure, a network side sending device that meets a preset condition according to reference signal received power RSRP of a positioning reference signal sent by multiple network side sending devices; and for each selected network side sending device, performing curve fitting by using indexes and RSRP of a plurality of positioning reference signals sent by the network side sending device, determining an angle of departure index corresponding to an angle of departure of the network side sending device according to a position point of the maximum RSRP on a curve obtained by fitting, and determining angle information corresponding to the angle of departure index according to angle information of a beam direction corresponding to each positioning reference signal sent by the network side sending device, which is obtained in advance, so as to obtain a value of the angle of departure of the network side sending device.

Optionally, the reporting unit 62 is further configured to send RSRP corresponding to the angle of departure indication information of the network side sending device to the network side positioning device, where the RSRP corresponding to the angle of departure indication information of the network side sending device is the maximum RSRP on the curve obtained through the fitting.

Optionally, the measurement reporting apparatus 60 further includes:
- a second receiving unit (not shown in FIG. 6), configured to receive, before the step of determining the angle of departure indication information of the network side transmitting device, angle information of a beam direction corresponding to the positioning reference signal transmitted by the network side transmitting device.

Figure 7:
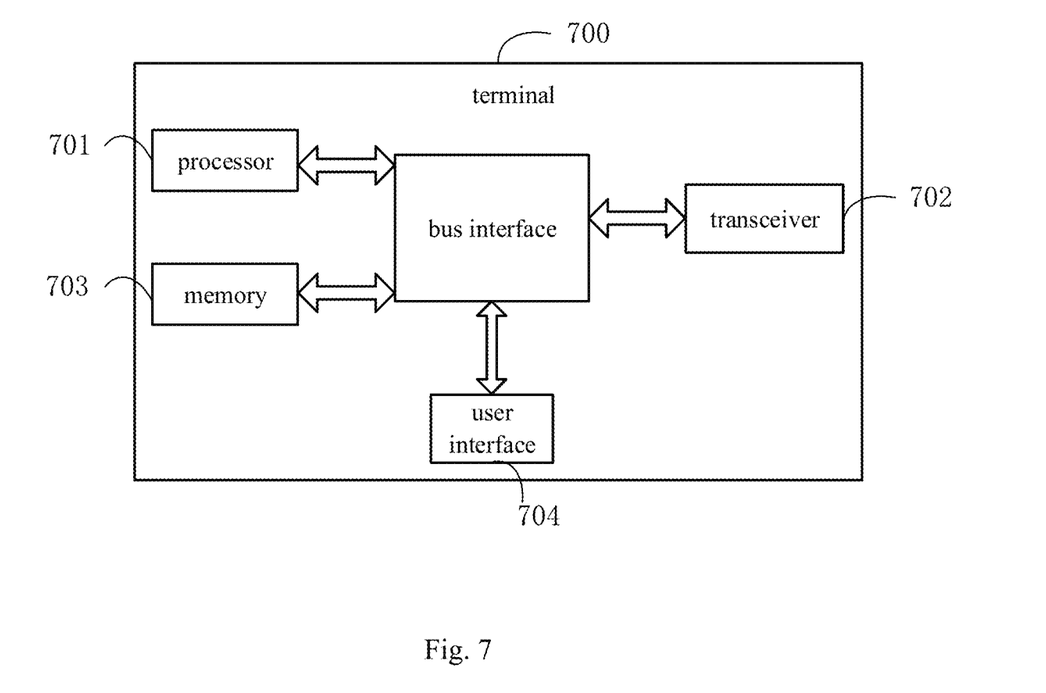
FIG. 7 is a block diagram of a terminal according to an embodiment of the present disclosure.

Referring to FIG. 7, a schematic structural diagram of a terminal according to an embodiment of the present disclosure includes: a processor 701, a transceiver 702, a memory 703, a user interface 704, and a bus interface.

In the embodiment of the present disclosure, the terminal 700 further includes: programs stored in the memory 703 and operable on the processor 701.

The processor 701 implements the following steps when executing the program: measuring positioning reference signals sent by a plurality of network side sending devices, and determining angle of departure indication information of the network side sending devices according to the measurement results of the positioning reference signals sent by the same network side sending device;

the transceiver 702 is configured to send angle of departure indication information of the multiple network-side sending devices to a network-side positioning device.

In FIG. 7, the bus architecture may include any number of interconnected buses and bridges, with various circuits representing one or more processors, in particular processor 701, and memory, in particular memory 703 being linked together. The bus architecture may also link together various other circuits such as peripherals, voltage regulators, power management circuits, and the like, which are well known in the art, and therefore, will not be described any further herein. The bus interface provides an interface. The transceiver 702 may be a plurality of elements including a transmitter and a receiver that provide a means for communicating with various other apparatus over a transmission medium. The user interface 704 may also be an interface capable of interfacing externally to a desired device for different user devices, including but not limited to a keypad, display, speaker, microphone, joystick, etc.

The processor 701 is responsible for managing the bus architecture and general processing, and the memory 703 may store data used by the processor 701 in performing operations.

Optionally, the processor further implements the following steps when executing the program: before measuring positioning reference signals sent by a plurality of network side sending devices, receiving measurement configuration information sent by the network side positioning devices, where the measurement configuration information includes configuration information of the positioning reference signals and configuration information of reported measurement, and the measurement includes angle of departure indication information.

Optionally, the angle of departure indication information includes at least one of the following information:

an angle of departure index corresponding to an angle of departure;

the value of the angle of departure.

Optionally, the angle of departure index is represented by an index value of the angle of departure index, or the angle of departure index is represented by a reference index of one of the positioning reference signals sent by the network side sending device and an offset relative to the reference index.

Optionally, when the processor 701 executes the program, the following steps are further implemented: when the angle of departure index is represented by the reference index and the offset, selecting network side sending device meeting a preset condition according to Reference Signal Received Power (RSRP) of positioning reference signals sent by a plurality of network side sending device; and for each selected network side sending device, performing curve fitting by using the indexes and RSRP of the positioning reference signals sent by the network side sending device, and determining a reference index and an index offset corresponding to an angle of departure of the network side sending device according to a position point of the maximum RSRP on a curve obtained by fitting.

Optionally, when the processor 701 executes the program, the following steps are further implemented: when the angle of departure indication information is the value of the angle of departure, selecting network side sending device meeting preset conditions according to Reference Signal Received Power (RSRP) of positioning reference signals sent by a plurality of network side sending device; and for each selected network side sending device, performing curve fitting by using indexes and RSRP of a plurality of positioning reference signals sent by the network side sending device, determining an angle of departure index corresponding to an angle of departure of the network side sending device according to a position point of the maximum RSRP on a curve obtained by fitting, and determining angle information corresponding to the angle of departure index according to angle information of a beam direction corresponding to each positioning reference signal sent by the network side sending device, which is obtained in advance, so as to obtain a value of the angle of departure of the network side sending device.

Optionally, when the processor 701 executes the program, the following steps are further implemented: and sending the RSRP corresponding to the angle of departure indication information of the network side sending device to network side positioning device, where the RSRP corresponding to the angle of departure indication information of the network side sending device is the maximum RSRP on the fitted curve.

Optionally, when the processor 701 executes the program, the following steps are further implemented: before the step of determining the angle of departure indication information of the network side transmission device, receiving the angle information of the beam direction corresponding to the positioning reference signal transmitted by the network side transmission device and transmitted by the network.

In some embodiments of the present disclosure, a computer readable storage medium having a program stored thereon is further provided in the present disclosure, the program when executed by a processor implementing the steps of:

measuring positioning reference signals sent by a plurality of network side sending devices, and determining angle of departure indication information of the network side sending devices according to the measurement results of the positioning reference signals sent by the same network side sending device;

sending the angle of departure indication information of the plurality of network side sending devices to the network side positioning device.

When executed by the processor, the program can implement all the implementation manners in the measurement reporting method applied to the terminal side, and can achieve the same technical effect, and is not described herein again to avoid repetition.

Figure 8:
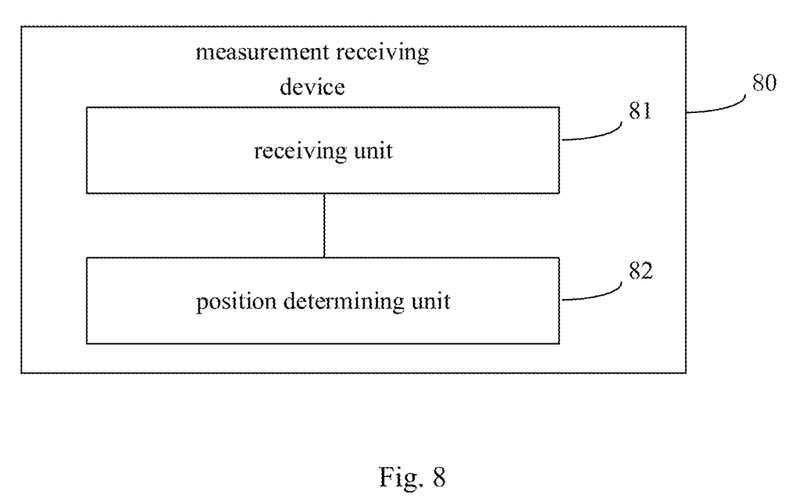
FIG. 8 is a block diagram of a measurement receiving device according to an embodiment of the disclosure.

The embodiment of the present disclosure provides a measurement receiving device shown in FIG. 8, which may be applied to a network side positioning device. Referring to FIG. 8, a measurement receiving device 80 provided in the embodiment of the present disclosure includes:

a receiving unit 81, configured to receive angle of departure indication information of multiple network side sending devices reported by terminal measurement;

a position determining unit 82, configured to determine location information of the terminal according to the angle of departure indication information of the multiple network-side sending devices.

Optionally, the measurement receiving device 80 further includes:

a first sending unit (not shown in FIG. 8) configured to send measurement configuration information to a terminal before receiving angle of departure indication information of multiple network-side sending devices that is reported by the terminal in a measurement manner, where the measurement configuration information includes configuration information of the positioning reference signal and configuration information of a measurement that is reported, and the measurement includes angle of departure indication information.

Optionally, the angle of departure indication information includes at least one of the following information:

an angle of departure index corresponding to an angle of departure;

the value of the angle of departure.

Optionally, the angle of departure index is represented by an index value of the angle of departure index, the angle of departure index is represented by a reference index of one of the positioning reference signals sent by the network side sending device and an offset relative to the reference index.

Optionally, when the angle of departure indication information is an angle of departure index corresponding to an angle of departure, the position determining unit 82 is further configured to determine, according to the angle of departure index corresponding to the angle of departure of each network-side sending device and the angle information of the beam direction corresponding to each positioning reference signal sent by the network-side sending device, the angle information corresponding to the angle of departure index of the network-side sending device, and obtain a value of the angle of departure of the network-side sending device; and determining the position information of the terminal by utilizing an angle positioning algorithm according to the values of the angle of departures of the plurality of network side sending devices.

Optionally, when the indication information of the angle of departure is a value of the angle of departure, the position determining unit 82 is further configured to determine the position information of the terminal by using an angle positioning algorithm according to the values of the angle of departures of the multiple network-side sending devices.

Optionally, the receiving unit is further configured to receive RSRP corresponding to angle of departure indication information of multiple network side sending devices sent by the terminal.

Optionally, the location determining unit 82 is further configured to select, according to an RSRP corresponding to the angle of departure indication information of the network side sending device, a network side sending device with an RSRP greater than a preset quality threshold from the multiple network side sending devices, and determine the location information of the terminal according to the angle of departure indication information of the selected network side sending device.

Optionally, when the network side positioning device is a network side positioning server, the measurement receiving device further includes:

an angle information receiving unit (not shown in FIG. 8) is configured to receive angle information of a beam direction corresponding to a positioning reference signal reported by a network side sending device.

Optionally, the measurement receiving device further includes:

an angle information indicating unit (not shown in FIG. 8) for indicating the angle information of the beam direction corresponding to the positioning reference signal to the terminal.

Figure 9:
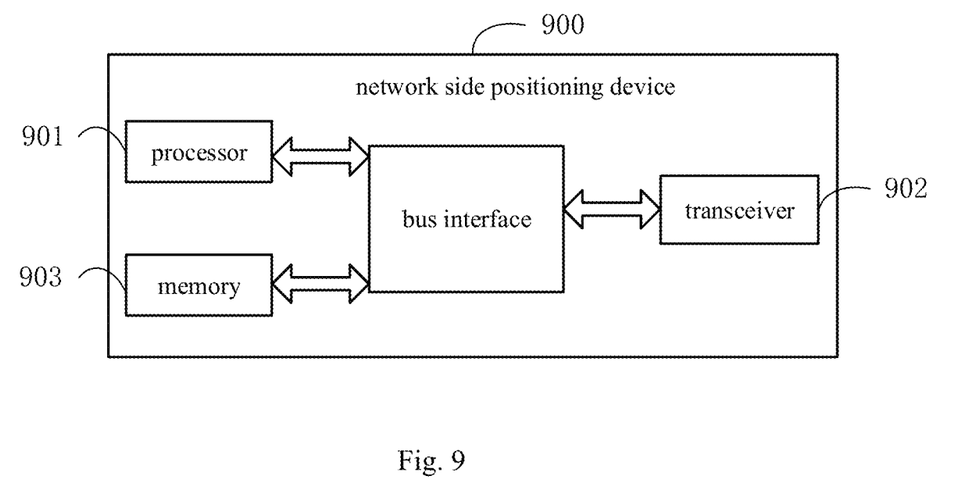
FIG. 9 is a structural diagram of a network side positioning apparatus according to an embodiment of the present disclosure.

Referring to FIG. 9, a network side positioning device 900 is provided in the embodiment of the present disclosure, including: a processor 901, a transceiver 902, a memory 903 and a bus interface, where:

a transceiver 902, configured to receive angle of departure indication information of multiple network-side sending devices that is reported by a terminal measurement;

the processor 901 implements the following steps when executing the program: and determining the position information of the terminal according to the angle of departure indication information of the network side sending devices.

In FIG. 9, the bus architecture may include any number of interconnected buses and bridges, with various circuits representing one or more processors, in particular processor 901, and memory, in particular memory 903, being linked together. The bus architecture may also link together various other circuits such as peripherals, voltage regulators, power management circuits, and the like, which are well known in the art, and therefore, will not be described any further herein. The bus interface provides an interface. The transceiver 902 may be a plurality of elements including a transmitter and a receiver that provide a means for communicating with various other apparatus over a transmission medium.

The processor 901 is responsible for managing the bus architecture and general processing, and the memory 903 may store data used by the processor 901 in performing operations.

Optionally, when the processor 901 executes the program, the following steps are further implemented: before receiving angle of departure indication information of a plurality of network side sending devices which are measured and reported by a terminal, sending measurement configuration information to the terminal, where the measurement configuration information includes configuration information of the positioning reference signal and configuration information of reported measurement, and the measurement includes angle of departure indication information.

Optionally, the angle of departure indication information includes at least one of the following information:

an angle of departure index corresponding to an angle of departure;

the value of the angle of departure.

Optionally, the angle of departure index may be represented by an index value of the angle of departure index, or the angle of departure index may be represented by a reference index of one of the multiple positioning reference signals sent by the network side sending device and an offset from the reference index.

Optionally, when the processor 901 executes the program, the following steps are further implemented: when the angle of departure indication information is an angle of departure index corresponding to an angle of departure, determining angle information corresponding to the angle of departure index of the network side transmission equipment according to the angle of departure index corresponding to the angle of departure of each network side transmission equipment and the angle information in the beam direction corresponding to each positioning reference signal transmitted by the network side transmission equipment, and obtaining a value of the angle of departure of the network side transmission equipment; and determining the position information of the terminal by utilizing an angle positioning algorithm according to the values of the angle of departures of the plurality of network side sending devices.

Optionally, when the processor 901 executes the program, the following steps are further implemented: and when the indication information of the angle of departure is the value of the angle of departure, determining the position information of the terminal by utilizing an angle positioning algorithm according to the values of the angle of departures of the plurality of network side sending devices.

Optionally, when the processor 901 executes the program, the following steps are further implemented: and receiving RSRP (reference signal received power) corresponding to angle of departure indication information of a plurality of network side sending devices sent by the terminal.

Optionally, when the network side positioning device is a positioning server on the network side, the processor 901 further implements the following steps when executing the program: and receiving the angle information of the beam direction corresponding to the positioning reference signal reported by the network side sending device.

Optionally, when the processor 901 executes the program, the following steps are further implemented: and indicating the angle information of the beam direction corresponding to the positioning reference signal to the terminal before the step of receiving the angle of departure indication information of the network side sending device, which is measured and reported by the terminal.

In some embodiments of the present disclosure, a computer readable storage medium having a program stored thereon is further provided in the present disclosure, the program when executed by a processor implementing the steps of:

receiving angle of departure indication information of a plurality of network side sending devices, which is measured and reported by a terminal;

determining the position information of the terminal according to the angle of departure indication information of the network side sending devices.

When executed by the processor, the program can implement all implementation manners in the measurement reporting method applied to the network side device, and can achieve the same technical effect, and is not described herein again to avoid repetition.

Those of ordinary skill in the art will appreciate that the various illustrative elements and algorithm steps described in connection with the embodiments disclosed herein may be implemented as electronic hardware, or combinations of computer software and electronic hardware. Whether such functionality is implemented as hardware or software depends upon the particular application and design constraints imposed on the technical solution. Skilled artisans may implement the described functionality in varying ways for each particular application, but such implementation decisions should not be interpreted as causing a departure from the scope of the present disclosure.

It can be clearly understood by those skilled in the art that, for convenience and simplicity of description, the specific working processes of the above-described systems, apparatuses and units may refer to the corresponding processes in the foregoing method embodiments, and are not described herein again.

In the embodiments provided in the present application, it should be understood that the disclosed apparatus and method may be implemented in other ways. For example, the above-described apparatus embodiments are merely illustrative, and for example, the division of the units is only one type of logical functional division, and other divisions may be realized in practice, for example, multiple units or components may be combined or integrated into another system, or some features may be omitted, or not executed. In addition, the shown or discussed mutual coupling or direct coupling or communication connection may be an indirect coupling or communication connection through some interfaces, devices or units, and may be in an electrical, mechanical or other form.

The units described as separate parts may or may not be physically separate, and parts displayed as units may or may not be physical units, may be located in one position, or may be distributed on multiple network units. Some or all of the elements may be selected according to actual needs to achieve the objectives of the embodiments of the present disclosure.

In addition, functional units in the embodiments of the present disclosure may be integrated into one processing unit, or each unit may exist alone physically, or two or more units are integrated into one unit.

The functions may be stored in a computer-readable storage medium if they are implemented in the form of software functional units and sold or used as separate products. Based on such understanding, the technical solutions of the present disclosure, which are essential or part of the technical solutions contributing to the prior art, may be embodied in the form of a software product, which is stored in a storage medium and includes several instructions for causing a computer device (which may be a personal computer, a server, or a network device) to execute all or part of the steps of the methods described in the embodiments of the present disclosure. And the aforementioned storage medium includes: a U disk, a removable hard disk, a ROM, a RAM, a magnetic disk or an optical disk, and various media capable of storing program codes.

The above description is only for the specific embodiments of the present disclosure, but the scope of the present disclosure is not limited thereto, and any person skilled in the art can easily think of the changes or substitutions within the technical scope of the present disclosure, and shall cover the scope of the present disclosure. Therefore, the protection scope of the present disclosure shall be subject to the protection scope of the claims.

What is claimed is:

1. A measurement reporting method, comprising:
    measuring, by a terminal, positioning reference signals sent by a plurality of network side sending devices, and determining, according to a measurement result of the positioning reference signals sent by each network side sending device, angle of departure indication information of the each network side sending device; and
    sending, by the terminal, the angle of departure indication information of the plurality of network side sending devices to a network side positioning device;
    wherein prior to the measuring by the terminal the positioning reference signals sent by the plurality of network side sending devices, the method further comprises:

receiving measurement configuration information sent by the network side positioning devices, wherein the measurement configuration information comprises configuration information of the positioning reference signals and configuration information of reported measurement, and the measurement comprises the angle of departure indication information;
wherein the angle of departure indication information comprises at least one of:
an angle of departure index corresponding to an angle of departure;
a value of the angle of departure;
wherein in a case that the angle of departure indication information is the value of the angle of departure, the determining the angle of departure indication information of the each network side sending device comprises:
selecting the network side sending devices meeting preset conditions, according to RSRP of positioning reference signals sent by the plurality of network side sending devices; and
for each of the selected network side sending devices, performing a curve fitting by using the indexes and RSRPs of the positioning reference signals sent by the each of the selected network side sending devices, and determining the angle of departure index corresponding to the angle of departure of the each of the selected network side sending devices, and determining angle information corresponding to the angle of departure index according to pre-obtained angle information of a beam direction corresponding to each positioning reference signal sent by the each of the selected network side sending devices, to obtain a value of the angle of departure of the each of the selected network side sending devices.

2. The method according to claim 1, wherein
the angle of departure index is represented by an index value of the angle of departure index, or
the angle of departure index is represented by a reference index of one of the positioning reference signals sent by each network side sending device.

3. The method according to claim 2, wherein in a case that the angle of departure index is represented by the reference index, the determining the angle of departure indication information of the each network side sending device comprises:
selecting the network side sending devices meeting preset conditions, according to a Reference Signal Received Power (RSRP) of positioning reference signals sent by the plurality of network side sending devices; and
for each of the selected network side sending devices, performing a curve fitting by using the an index and RSRP of the positioning reference signals sent by the each of the selected network side sending devices, and determining the reference index and an index offset corresponding to the angle of departure of the each of the selected network side sending devices, according to a position point of a maximum RSRP on a curve obtained by the curve fitting.

4. The method according to claim 3, further comprising:
sending the RSRP corresponding to the angle of departure indication information of the each of the selected network side sending devices to a network side positioning device, wherein the RSRP corresponding to the angle of departure indication information of the each of the selected network side sending devices is a maximum RSRP on a curve obtained by the curve fitting.

5. The method according to claim 1, wherein prior to the determining the angle of departure indication information of the each network side sending device comprises:
receiving the angle information of the beam direction corresponding to each positioning reference signal sent by the each of the selected network side sending devices.

6. A measurement receiving method, comprising:
receiving, by a network side positioning device, angle of departure indication information of a plurality of network side sending devices which is measured and reported by a terminal; and
determining, by the network side positioning device, position information of the terminal, according to the angle of departure indication information of the plurality of network side sending devices;
wherein prior to the receiving by the network side positioning device the angle of departure indication information of the plurality of network side sending devices which is measured and reported by the terminal, the method further comprises:
sending measurement configuration information to the terminal, wherein the measurement configuration information comprises configuration information of the positioning reference signals and configuration information of reported measurement, and the measurement comprises the angle of departure indication information;
wherein the angle of departure indication information comprises at least one of:
an angle of departure index corresponding to an angle of departure;
a value of the angle of departure;
wherein the angle of departure index is represented by an index value of the angle of departure index, or
the angle of departure index is represented by a reference index of one of the positioning reference signals sent by each network side sending device;
wherein in a case that the angle of departure indication information is the angle of departure index corresponding to the angle of departure, the determining by the network side positioning device the position information of the terminal comprises:
based on the angle of departure index corresponding to the angle of departure of each network side sending device and angle information of a beam direction corresponding to each positioning reference signal sent by the each network side sending device, determining angle information corresponding to the angle of departure index of the each network side sending device, to obtain a value of the angle of departure of the each network side sending device; and
determining the position information of the terminal, by using an angle positioning algorithm and according to the values of the angle of departure of the plurality of network side sending devices.

7. The method according to claim 6, wherein in a case that the angle of departure indication information is the value of the angle of departure, the determining the position information of the terminal comprises:
determining the position information of the terminal, by using an angle positioning algorithm and according to the values of the angle of departure of the plurality of network side sending devices.

8. The method according to claim 6, further comprising:
receiving a reference signal received power (RSRP) corresponding to angle of departure indication information of the plurality of network side sending devices sent by the terminal.

9. The method according to claim 6, wherein in a case that the network side positioning device is a positioning server at a network side, the method further comprises:
receiving, by the network side positioning device, angle information of a beam direction corresponding to the positioning reference signal reported by the network side sending device.

10. The method according to claim 6, wherein prior to the receiving by the network side positioning device the angle of departure indication information of the plurality of network side sending devices which is measured and reported by the terminal, the method further comprises:
indicating by the network side positioning device, to the terminal, angle information of a beam direction corresponding to the positioning reference signal.

11. A network-side positioning apparatus, comprising: a memory, a processor, a transceiver, and a program stored in the memory and executable on the processor, wherein the processor is configured to execute the program to perform the measurement receiving method according to claim 6.

12. A terminal, comprising: a memory, a processor, a transceiver, and a program stored in the memory and executable on the processor, wherein the processor is configured to execute the program to perform:
measuring positioning reference signals sent by a plurality of network side sending devices, and determining, according to a measurement result of the positioning reference signals sent by each network side sending device, angle of departure indication information of the each network side sending device;
the transceiver is configured to send the angle of departure indication information of the plurality of network side sending devices to a network side positioning device;
wherein prior to the measuring by the terminal the positioning reference signals sent by the plurality of network side sending devices, the transceiver is configured to:
receive measurement configuration information sent by the network side positioning devices, wherein the measurement configuration information comprises configuration information of the positioning reference signals and configuration information of reported measurement, and the measurement comprises the angle of departure indication information;
wherein the angle of departure indication information comprises at least one of:
an angle of departure index corresponding to an angle of departure;
a value of the angle of departure;
wherein in a case that the angle of departure indication information is the value of the angle of departure, the processor is configured to execute the program to perform:
selecting the network side sending devices meeting preset conditions, according to RSRP of positioning reference signals sent by the plurality of network side sending devices; and
for each of the selected network side sending devices, performing a curve fitting by using the indexes and RSRPs of the positioning reference signals sent by the each of the selected network side sending devices, and determining the angle of departure index corresponding to the angle of departure of the each of the selected network side sending devices, and determining angle information corresponding to the angle of departure index according to pre-obtained angle information of a beam direction corresponding to each positioning reference signal sent by the each of the selected network side sending devices, to obtain a value of the angle of departure of the each of the selected network side sending devices.

* * * * *